United States Patent [19]

Massa

[11] 4,198,705

[45] Apr. 15, 1980

[54] DIRECTIONAL ENERGY RECEIVING SYSTEMS FOR USE IN THE AUTOMATIC INDICATION OF THE DIRECTION OF ARRIVAL OF THE RECEIVED SIGNAL

[75] Inventor: Frank Massa, Cohasset, Mass.

[73] Assignee: The Stoneleigh Trust, Donald P. Massa and Fred M. Dellorfano, Trustees, Cohasset, Mass.

[21] Appl. No.: 914,009

[22] Filed: Jun. 9, 1978

[51] Int. Cl.² .............................................. G01S 3/80
[52] U.S. Cl. ...................................... 367/126; 343/119
[58] Field of Search ............... 343/119, 123; 340/6 R,

[56] References Cited

U.S. PATENT DOCUMENTS

| 2,457,199 | 12/1948 | Best | 343/101 |
|---|---|---|---|
| 2,994,081 | 7/1961 | Jordan et al. | 343/123 X |
| 4,114,157 | 9/1978 | Samukawa | 343/119 |

Primary Examiner—Maynard R. Wilbur
Assistant Examiner—Richard E. Berger

[57] ABSTRACT

A fixed array of three identical directional receivers, each having a cardioid directional pattern, are arranged in a symmetrical configuration with each receiver having its principal axis of maximum sensitivity oriented 120° from the corresponding axes of its neighbors. By comparing the relative magnitudes of the voltages generated in each of the three cardioid receivers upon receiving a signal, the bearing of the signal source is automatically determined and displayed. The tri-cardioid receiving array overcomes the prior art need for large-sized directional receiving transducers, and also overcomes the need for mechanically rotating or electronically scanning the receiving array to find the bearing of the signal source.

8 Claims, 6 Drawing Figures

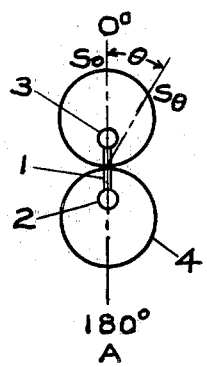
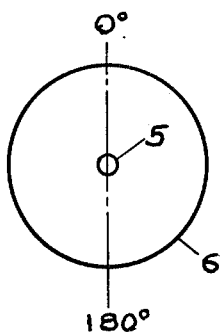
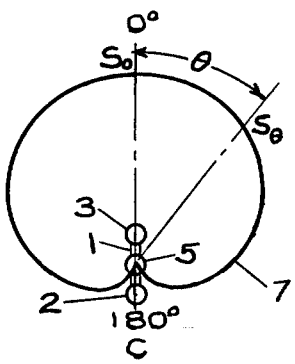
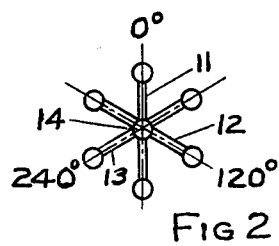
FIG 1
FIG 2
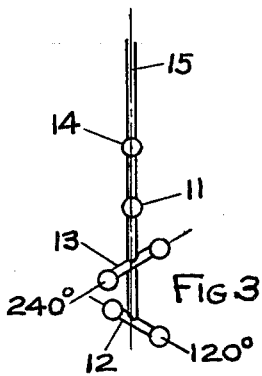
FIG 3
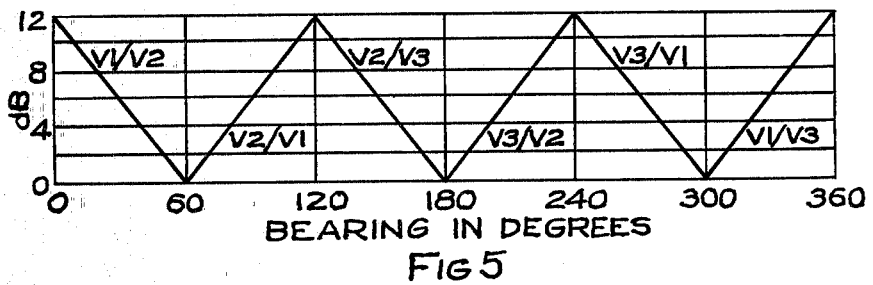
FIG 5
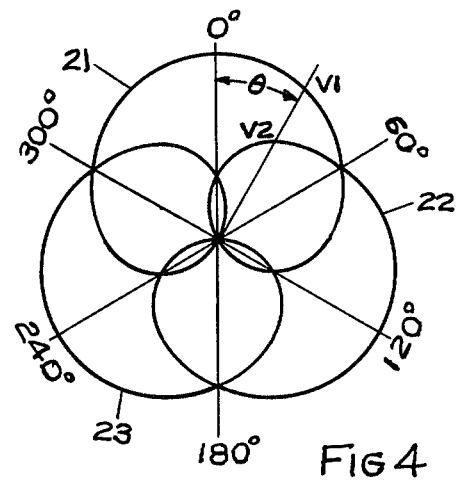
FIG 4
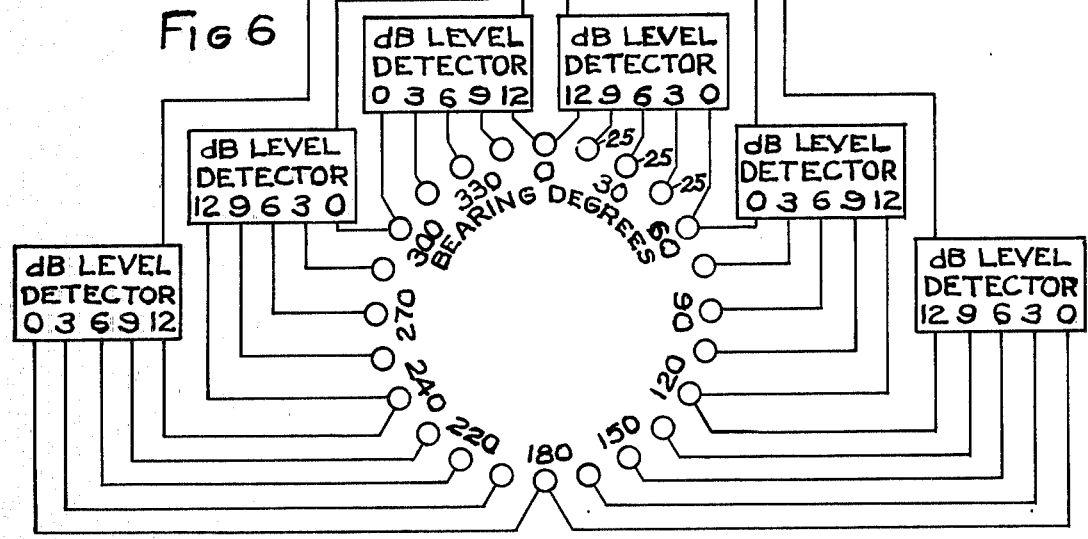
FIG 6

DIRECTIONAL ENERGY RECEIVING SYSTEMS FOR USE IN THE AUTOMATIC INDICATION OF THE DIRECTION OF ARRIVAL OF THE RECEIVED SIGNAL

This invention is concerned with a novel directional receiving system capable of indicating the relative bearing of a received signal without need for mechanically rotating or electronically steering the receiving array. In prior art bearing indicating systems, such as submarine detection sonar systems or airplane detection radar systems, the receiver is generally a highly directional detector which is mechanically rotated, such as a radar antenna, or is scanned electronically, such as a scanning sonar receiving transducer. Both these prior art systems require structures which are large compared with the wavelength of the received signal in order to produce the narrow beam angle that is required for the successful operation of the bearing indicating function of the system. The present invention eliminates the need for large-size structures and also eliminates the need for mechanically rotating the receiver or electronically scanning the receiving array.

The primary object of this invention is to simplify the design of a directional energy receiving system to provide accurate bearing indication of the position of a sound source or a sound reflecting sonar target or the indication of the position of a radio frequency source or of a radar reflecting target.

Another object of this invention is to reduce the size and cost of a directional energy receiving system.

A further object of this invention is to provide a receiving array which is fixed in position and is capable of accurately indicating the bearing of an energy source or an energy reflecting target by a simple comparison of the relative magnitudes of the electrical signals generated in different sections of the receiving array.

A still further object of this invention is to provide a fixed directional receiving array for giving automatic bearing indication which includes three separate receiving units, each having a cardioid directional pattern for its directional response characteristic and each unit mounted with its principal axis oriented 120° from each of its two neighbors.

An additional object of this invention is to determine the bearing of a received signal by measuring the ratios of the amplitudes of the output signal levels generated in each of the receiving elements of a symmetrical array of three directional receivers with cardioid directional patterns upon receiving a signal.

These and other objects are accomplished by a preferred embodiment of the invention which may be understood best from a study of the following description and the accompanying drawings, in which:

FIG. 1 shows a cardioid directional receiving pattern (C) obtained by combining the output from a dipole receiver (A) with the output from an omnidirectional receiver (B).

FIG. 2 is a schematic plan view showing three dipole receivers mounted with their axes of maximum sensitivity oriented 120° from each other in the horizontal plane, and an omnidirectional receiver centrally located along the vertical center line of the mounted dipoles.

FIG. 3 is a vertical view of the receiving array illustrated in FIG. 2.

FIG. 4 shows the overlapping horizontal cardioid directional patterns obtained by separately combining the received signal from the omnidirectional receiver with each of the separate dipole receivers mounted as illustrated in FIGS. 2 and 3.

FIG. 5 shows a plot of the ratios of the magnitude of the output voltages generated in each separate pair of directional cardioid pattern receivers having the overlapping directional patterns illustrated in FIG. 4 as a function of the bearing of the arriving signal.

FIG. 6 is a schematic electrical block diagram illustrating a means for combining the receiver output signals from each of the three cardioid pattern directional receivers mounted as illustrated in FIGS. 2 and 3 to give instant automatic bearing indication of the direction from which a detected signal is received.

Referring more specifically to the figures, FIG. 1 illustrates the well-known directional response characteristics of the different basic types of transducer elements that will be referred to in this invention. FIG. 1A is a schematic illustration of a pressure gradient or dipole transducer 1 which is represented by two identical omnidirectional transducer elements 2 and 3 spaced apart along their common 0°–180° axis and electrically connected with their individual outputs in phase opposition. The sensitivity of the dipole transducer as a function of bearing angle $\theta$ is illustrated by the directional response pattern 4 and is described by the relationship $$S_\theta = S_o \cos\theta \qquad (1)$$

where:
$S_o$ is the sensitivity along the axis 0°
$S_\theta$ is the sensitivity along the axis $\theta$ FIG. 1B is a schematic illustration of an omnidirectional transducer 5 and its directional response characteristic 6 which is defined by the relationship $$S_\theta = S_o \qquad (2)$$

If the omnidirectional transducer 5 is located at the center of the dipole transducer 1, as illustrated in FIG. 1C, the combined outputs from the two transducers will have a cardioid directional response pattern 7 as defined by the sum of equations (1) and (2) which is $$S_\theta = S_o(1 + \cos\theta) \qquad (3)$$

The derivation of the cardioid directional pattern by combining the output from a dipole with the output from an omnidirectional element is well known in the prior art. (See, for example, "Applied Acoustics" by Olson and Massa, 2nd Edition, Blakiston, Philadelphia, 1939, Chapter 5.14, page 142).

FIGS. 2 and 3 illustrate the proposed mounting of three identical dipole transducers 11, 12, and 13 with their axes of maximum sensitivity oriented 120° from each other in the horizontal plane in order to accomplish the objects of this invention. Above the dipole transducers is mounted an omnidirectional transducer 14 which is spaced along the vertical axis 15, as illustrated in FIG. 3. By separately combining the output from the omnidirectional transducer 14 with each of the outputs from the dipole transducers 11, 12, and 13, three cardioid pattern directional receivers will result with their sensitivity patterns 21, 22, and 23 oriented 120° from each other in the horizontal plane, as illustrated in FIG. 4.

The electrical outputs from each of the transducers 11, 12, 13, and 14 are suitably isolated from one another by any well known means, such as, for example, by the use of separate buffer amplifier stages before combining their outputs to achieve the symmetrical tri-cardioid pattern array, as illustrated. It is of course also necessary to equalize the sensitivity of the omnidirectional transducer 14 with the maximum on-axis sensitivities of each of the dipole transducers 11, 12, and 14 before combining their output signals in order to achieve the desired cardioid directional patterns illustrated in FIG. 4. The sensitivity adjustments may be made by adjusting the gains in the buffer amplifiers if they are employed, or by any other means well known in the electronic art. Details of the method used for isolating the transducer outputs by the use of buffer amplifiers or otherwise are not shown, nor are the details shown of the method for equalizing the sensitivities of each of the three dipoles 11, 12, and 13 along their axes of maximum response with the sensitivity of the omnidirectional transducer 14, such as, for example, adjusting the relative gains in the buffer amplifier stages, because these procedures are very well known in the art and do not in themselves form part of this invention.

If the output signals V1, V2, and V3 from the three cardioid receivers, mounted symmetrically with their respective directional patterns 21, 22, and 23 oriented as shown in FIG. 4, are compared with one another, the ratios of the magnitudes of the three output signals can be utilized to give the true bearing indication of the received signal directly without need for rotating the receiving array and without need for making phase measurements among the output signals.

It is evident from the symmetry of the array patterns shown in FIG. 4 that the maximum sensitivity of each of the three cardioid pattern receivers 21, 22, and 23 in the array occur respectively at 0°, 120°, and 240° bearings, and that equal sensitivities from adjacent pairs of cardioid receivers occur at 60°, 180°, and 300° bearings, as illustrated. It will be shown from the geometry of FIG. 4 that for a signal arriving from any direction having a bearing angle $\theta$, a comparison of the relative magnitudes of the output voltages V1, V2, and V3, from the three cardioid receivers 21, 22, and 23 will give an immediate accurate indication of the bearing angle $\theta$. If the magnitudes of the output voltage levels V1, V2 and V3 generated by the arriving signal in each of the 0°, 120°, and 240° oriented directional receivers having the cardioid patterns 21, 22, and 23 are compared with one another to establish which of the output voltage levels V1, V2, or V3 is the largest in magnitude and which of the voltage levels is next to the largest in magnitude, the six possible combinations that can occur will immediately indicate within what 60° zone the bearing angle of the arriving signal is located. For example, if V1 is the largest among the three output signals, and V2 is the next largest in magnitude, as illustrated in FIG. 4, then the bearing angle $\theta$ lies between 0° and 60°. If the magnitude V2 is largest and V1 the next largest, the bearing angle $\theta$ lies between 60° and 120°. It is obvious from FIG. 4 by applying the same reasoning for all possible combinations of V1, V2, and V3 that the particular 60° zone in which the bearing angle of the signal source is located is immediately established. To determine the exact location of the bearing angle within the particular 60° zone in which the signal arrives, the ratio of the largest to the next largest output voltage is computed by the processing circuit, and the magnitude of the ratio is used to activate a display to show the compass bearing of the arriving target signal.

To illustrate the bearing accuracy that can be realized by the inventive system, a computation will be made to show the variation in the magnitude of the output level ratio V1/V2 as a function of the bearing angle $\theta$ within the zone 0° to 60°. It is obvious from the symmetry of FIG. 4 that the computed data for the 0° to 60° zone will repeat in each of the additional 60° zones represented by the six different possible combinations of ratios of outputs from the three cardioids.

For a signal arriving along the bearing angle $\theta$ in FIG. 4, the magnitude of the largest output signal is V1 from cardioid 21 and the next largest output signal is V2 from cardioid 22, as illustrated. From equation (3), it follows that the magnitudes of V1 and V2 can be represented by:

$$V1 = 1 + \cos \theta \tag{4}$$

$$V2 = 1 + \cos(120° - \theta) \tag{5}$$

Using equations (4) and (5), the data tabulated below have been computed:

| $\theta°$ | $\cos \theta$ | $\cos(120° - \theta)$ | V1 | V2 | V1/V2 dB |
|---|---|---|---|---|---|
| 0 | 1.000 | −.500 | 2.00 | .50 | 12.0 |
| 10 | .985 | −.342 | 1.99 | .66 | 9.6 |
| 20 | .940 | −.174 | 1.94 | .83 | 7.4 |
| 30 | .866 | 0 | 1.87 | 1.00 | 5.4 |
| 40 | .766 | .174 | 1.77 | 1.17 | 3.5 |
| 50 | .643 | .342 | 1.64 | 1.34 | 1.8 |
| 60 | .500 | .500 | 1.50 | 1.50 | 0 |

An inspection of the last column of data indicates that the ratio of the output voltages V1/V2 changes approximately 2 dB for each 10° change in bearing of the received signal. A curve showing the output voltage ratios received from the tri-cardioid array of FIG. 4 as a function of bearing angle throughout the entire 360° region is plotted in FIG. 5. It can be seen that each of the six different combinations of output voltage ratios marked on the curve will give an accurate indication of the bearing of the received signal when it arrives within the designated 60° portion of the compass bearing indicated by the abscissa.

An automatic means for bearing indicator can be achieved by connecting the outputs V1, V2, and V3 from the three cardioid receivers 21, 22, and 23 of FIG. 4 to the inputs of a signal processor 24, as schematically illustrated in FIG. 6. The signals V1, V2, and V3 represent the relative magnitudes of the output voltages from the three cardioid receivers 21, 22, and 23 when a signal is received along a particular bearing axis. The three signals are processed by conventional electronic circuits which are well known in the art and are not a part of this invention. The circuit logic continuously compares the relative magnitudes of V1, V2, and V3 when a signal is being received by the three cardioids in the array, and then the processing circuit generates a signal which is proportional to the ratio of the largest to the next largest magnitudes of the three cardioid receiver signals. Since six different combinations of output signal ratios are possible, depending on the bearing of the received signal, as illustrated in FIGS. 4 and 5, there will be six different possible combinations of output voltage ratios appearing at the output of the signal processor 24, as schematically illustrated in FIG. 6. Each of the six separate voltage ratio channels shown at the output of the signal processor 24 is connected to a separate level detector, as shown in FIG. 6. The level detector connected across the output V1/V2 receives the V1/V2 signal from the signal processor which will appear when the bearing of the received signal lies within the 0° to 60° zone, as illustrated in FIG. 5. Another level detector such as the level detector connected across V2/V1 will receive the signal V2/V1 from the signal processor 24 when the bearing of the received signal lies within the 60° to 120° zone. The remainder of the level detectors will be activated by the particular output voltage ratios from the signal processor 24 to which they are connected, as illustrated in the schematic diagram in FIG. 6.

The level detectors include electronic circuitry well known in the art for establishing progressive steps in signal threshold levels for activating a different control circuit for each threshold step. Each level detector in FIG. 6 is illustrated as having five different output control circuits that become successively activated with voltage ratio level changes in increments of 3 dB. The specific dB threshold levels are shown as 0 dB, 3 dB, 6 dB, 9 dB, and 12 dB. Each 3 dB change in level causes a control circuit to activate an indicator light 25 located 15° apart on a compass circle, as shown in FIG. 6. The five control circuits from level detector V1/V2 are shown connected to the five indicator lights placed at 15° intervals between 0° bearing and 60° bearing. Level detector V2/V1 has its five output control circuits connected to the five indicator lights placed at 15° intervals between 60° bearing and 120° bearing. The remainder of the level detectors are progressively connected so that the entire 360° bearing range is covered by the 24 indicator lights 25 spaced 15° apart. The entire 360° bearing is totally controlled by the six level detectors; each detector controls a specific 60° zone of indicator lights of the total 360° compass circle, as illustrated in FIG. 6.

The tri-cardioid pattern receiving array, as described, provides an automatic direct indication of the bearing of the received signal by the lighting of an indicator light located at the bearing angle of the received signal. The lights are used as indicators in the description of the invention in order to simplify the illustration. It is obvious that any other indicator means may be provided to show the bearing. For example, a digital LED numerical display of the bearing could be used. Also, the bearing indicator signals from the signal processor 24 could be used to operate a stepping motor in the conventional manner to turn a pointer over a 360° compass scale for showing the bearing directly on a compass dial. These and other well-known methods of data display could be used for showing the bearing of the received signal.

This invention is not specifically concerned with the particular means used for displaying the bearing data; it is only concerned with the use of three directional receivers having approximately cardioid patterns mounted in a fixed symmetrical position relative to one another, as described, and capable of indicating the bearing of a received signal without need for mechanically rotating or electronically steering the receiving array. The direct measurement of bearing angle in 15° steps in the inventive system is accomplished by comparing the ratio of the amplitudes of the largest to the next largest voltage appearing at the outputs of the cardioid pattern receivers in increments of 3 dB. If 2 dB increments of level comparison were used, 36 lights spaced 10° apart could be used for the bearing indicators. To obtain a 10° resolution with a conventional directional transducer having a 10° beam angle requires a structure 6 wavelengths in diameter which becomes an enormous size for a sonar transducer to be used in the lower audible frequency region. For example, at a frequency of 600 Hz, the conventional circular piston transducer array would have to be 50 feet in diameter to achieve the 10° beam. With the use of the three cardioid pattern receiving array, as disclosed, the 10° steps in bearing indication can be achieved with a relatively small array of elements occupying a space less than two feet in diameter.

It can be noted in FIG. 6 that each of the six indicator lights located at 60° intervals in bearing is supplied with connections from adjacent level detectors, each having the same indicated dB signal levels. For example, at the 60° bearing location, the signal from the level detector connected across V1/V2 and having a dB level magnitude of 0 dB is connected to activate the indicator light. The output signal from the level detector connected across the V2/V1 output terminals of the signal processor 24 and having a dB level magnitude of 0 dB is also connected to activate the same indicator light. The justification for this dual connection is obvious by referring to FIG. 4 which shows that V1 and V2 are equal in magnitude at 60° bearing, and therefore V1/V2=V2/V1, so that either signal level can activate the same light.

A special case of a three cardioid receiving array can be achieved by arranging six identical omnidirectional receivers at the corners of a hexagon and making dipoles of the three diametrically opposed pairs of elements. If the diametrical spacing of the elements is made equal to one-sixth wavelength of the signal being received, the maximum sensitivity of the dipole pairs will be numerically equal to the sensitivity of one of the omnidirectional elements. Therefore, the use of a dipole comprising two identical omnidirectional elements spaced 1/6th wavelength apart in combination with another identical omnidirectional element located at the center of the dipole pair will produce a true cardioid pattern directly without need for adjusting or balancing the sensitivities of the dipoles with respect to the omnidirectional unit. In the above sonar example that requires a 50 foot diameter conventional transducer to achieve a 10° beam at 600 Hz will need a dipole spacing slightly less than 17" to achieve the cardioid characteristics required in the inventive system to get a 10° bearing resolution with a 2 dB differential in level measurement.

The use of the cardioid patterns in the described preferred embodiment of the invention achieves the object of the invention with convenient transducer structures that produce ideal directional patterns for efficiently performing the automatic bearing indication. It is possible to deviate from the ideal cardioid patterns which have been described and still achieve the advantages of using a small three-element array to directly measure the bearing of the path of an arriving signal. It is only necessary that the directional patterns of the three transducers are such that when they are mounted with their axes of maximum sensitivity rotated 120° from each other, the sensitivity of each transducer over the angle ±60° from its axis of maximum sensitivity is greater than the sensitivity of its neighboring transducers within the ±60° angle.

It should be understood that additional modifications and alternative constructions may be made without departing from the true spirit and scope of the inven-

I claim:

1. In combination in a directional energy receiving system, three directional receiving transducers, each characterized in that its receiving sensitivity S as a function of angle $\theta$ from its normal axis of maximum sensitivity is defined by the approximate relationship $S=(1+\cos\theta)$ over an angle of $\pm 120°$ from its normal axis, structural support means for mounting said directional receiving transducers in a symmetrical array, said structural support means characterized in that the axis of maximum sensitivity of each of said mounted directional receivers in the array is oriented 120° from the axes of maximum sensitivity of each of its neighbors, electronic circuit means connected to the output of each of said directional receivers, said electronic circuit means including signal processing means for comparing the ratios of the magnitudes of the output signal levels from each adjacent pair of transducers in the array when said array is receiving a signal which is arriving from a direction whose bearing angle relative to a particular fixed reference mechanical axis of said mounted array structure is unknown, and indicator means selectively responsive to the relative magnitudes of said comparative output signal levels from each of said adjacent pair of receivers whereby said indicator means indicates said unknown bearing angle of the path along which said energy signal is traveling.

2. The invention in claim 1 further characterized in that said indicator means includes a visual display.

3. The invention in claim 2 further characterized in that said visual display comprises a plurality of visual indicators spaced at discrete angular positions corresponding to discrete bearing angles about the points of a compass.

4. The invention in claim 1 characterized in that said indicator means comprises a digital display to indicate the bearing angle.

5. In combination in a directional energy receiving system, two directional receiving transducers, each characterized in that its receiving sensitivity S as a function of angle $\theta$ from its normal axis of maximum sensitivity is defined by the approximate relationship $S=(1+\cos\theta)$ over an angle of approximately $\pm 120°$ from its normal axis, structural support means for mounting said directional receiving transducers in an array with the axis of maximum sensitivity of each directional transducer pointing 120° apart in relative bearing from each other, electronic circuit means connected to the output of each of said directional receivers, said electronic circuit means including signal processing means for comparing the ratios of the magnitude of the output signal level from each of the said receiving transducers when said receiving array is activated by an energy signal which is arriving from a direction whose bearing angle is unknown, and indicator means selectively responsive to the relative magnitudes of said comparative output signal levels from each of said receivers whereby said indicator means indicates said unknown bearing angle.

6. The invention in claim 5 further characterized in that said indicator means includes a visual display.

7. In combination in a directional energy receiving system, a plurality of directional receiving transducers, each characterized in that its receiving sensitivity S as a function of angle $\theta$ from its normal axis of maximum sensitivity is defined by the approximate relationship $S=(1+\cos\theta)$ over an angle of approximately $\pm 120°$ from its normal axis, structural means for mounting said directional receiving transducers in an array with the axis of maximum sensitivity of each directional transducer pointing 120° apart in relative bearing from its neighbor, electronic circuit means connected to the output of each of said directional receivers, said electronic circuit means including signal processing means for comparing the ratios of the magnitudes of the output signal level from each of said receiving transducers when said receiving array is activated by an energy signal which is arriving from a direction whose bearing angle is unknown, and indicator means selectively responsive to the relative magnitudes of said comparative output signal levels for each of said receivers whereby said indicator means indicates said unknown bearing angle.

8. The invention in claim 7 characterized in that said directional receivers include six omnidirectional transducers located at the corners of a hexagon and further characterized in that each diametrically opposite pair of omnidirectional transducers are connected with their outputs opposing to form three identical dipole pairs symmetrically located with their axes oriented 120° from each other, and still further characterized in that a seventh omnidirectional transducer is located in the center of the six element hexagonally spaced array, and further characterized in that the output from each of the dipole pairs is separately combined with the output of the centrally located transducer whereby a three-directional receiver array is achieved, and still further characterized in that the axial spacing of each diametrically opposed dipole pair is approximately 1/6 wavelength of the signal whose bearing angle is being indicated.

* * * * *

UNITED STATES PATENT AND TRADEMARK OFFICE
CERTIFICATE OF CORRECTION

PATENT NO. : 4,198,705
DATED : April 15, 1980
INVENTOR(S) : Frank Massa

It is certified that error appears in the above-identified patent and that said Letters Patent is hereby corrected as shown below:

Column 2, line 27, "$S_{74}$" should read -- $S_\theta$ --

Signed and Sealed this

Twenty-ninth Day of March 1983

[SEAL]

Attest:

GERALD J. MOSSINGHOFF

Attesting Officer  Commissioner of Patents and Trademarks